Nov. 30, 1937.　　　　G. E. R. SALEH　　　　2,100,570
ANCHORING DEVICE
Filed Sept. 23, 1936　　　2 Sheets-Sheet 1
Fig.1.
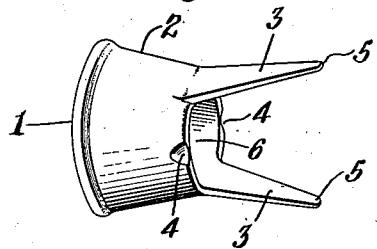
Fig.2.
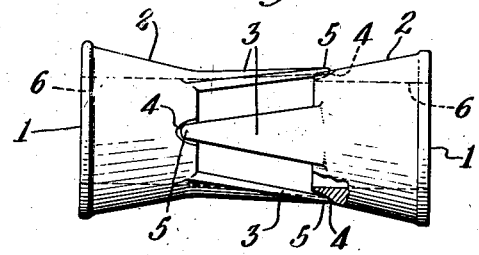
Fig.3.
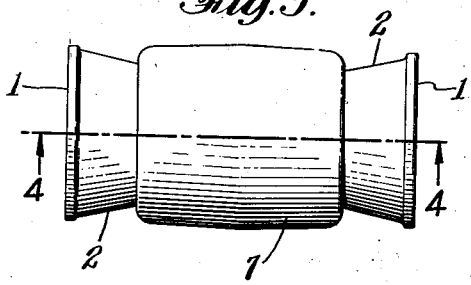
Fig.4.
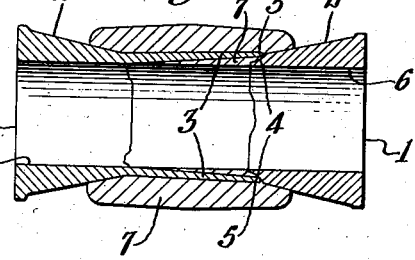
Fig.5.
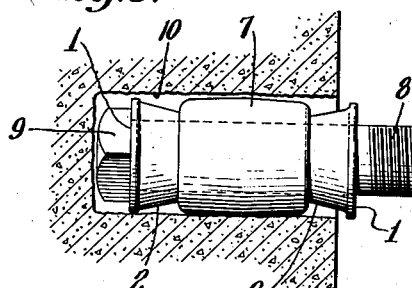
Fig.6.
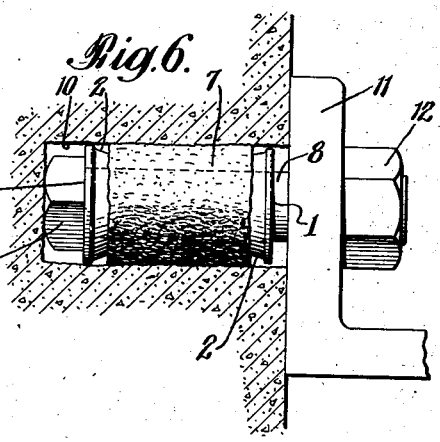
Fig.7.
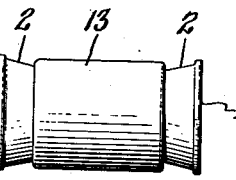
Fig.8.
Gabriel E. R. Saleh INVENTOR
BY Alan W. Johnson ATTORNEY

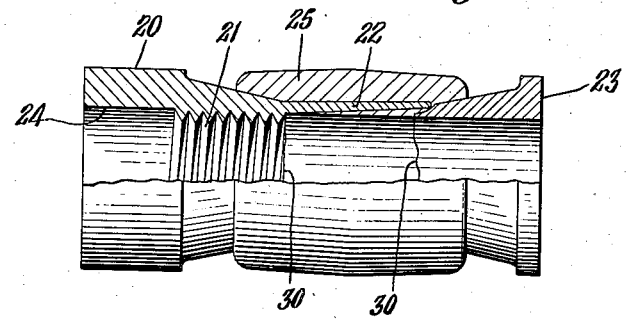
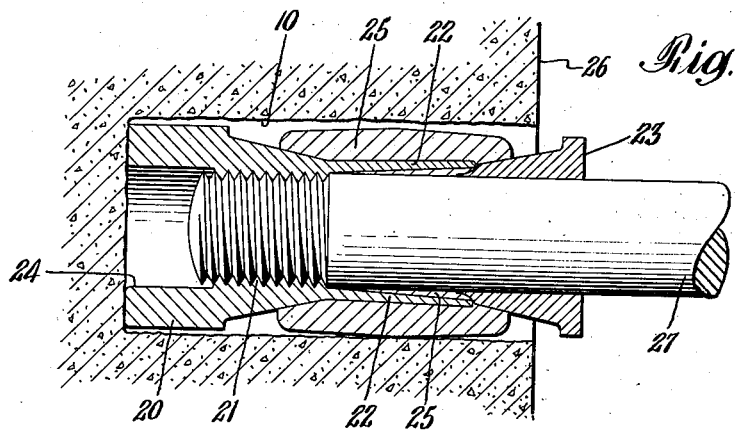
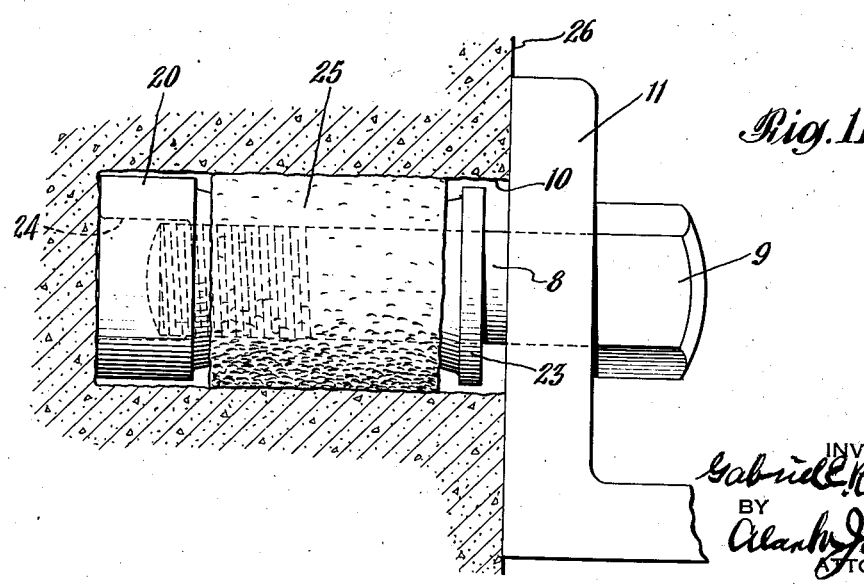

Patented Nov. 30, 1937

2,100,570

UNITED STATES PATENT OFFICE 2,100,570

ANCHORING DEVICE

Gabriel E. Rohmer Saleh, New York, N. Y., assignor to Diamond Expansion Bolt Company, Inc., Garwood, N. J., a corporation of New Jersey Application September 23, 1936, Serial No. 102,111

12 Claims. (Cl. 72—105)

My invention relates to heavy duty anchoring devices which, after being located in a hole in masonry, concrete, brick, rock or other similar supports are expanded by calking, ramming, or by any other means of exerting expansion or pressure upon the composite parts of the anchor.

My invention further comprises an anchoring device formed of separate, distinct, duplicate, rigid non-compressible expanding members having extensions or wings, which are an integral part of each separate expanding member, and are arranged in such a manner that they are directly in contact with the other expanding member, the parts being held together by an exterior, intermediate expansible deformable material, such as lead, and its alloys, or similar ductile metals and their alloys, which is the expansible member of my anchoring device.

My invention further embodies expanding members which have no rights or lefts. This reduces the cost of manufacture and the cost of assembling the parts, prior to casting the expansible lead, or similar material, around the expanding members.

Another object and purpose of my invention is to have all embodiments of my anchoring device made in such a manner that there shall always be provided an adequate mass of expansible and moldable material, and even a surplus of such a mass, localized between the expanding members when they are put to use, since my anchors are mostly intended for heavy duty and the support of relatively heavy loads, thereby preventing the small ends of the convergent conical, rigid, expanding members coming in contact with each other, all of which will be more fully hereinafter described and pointed out in the claims.

My invention further relates to certain combinations, sub-combinations, articles of manufacture, and details of construction, all of which will be more fully hereinafter described and pointed out in the claims.

Fig. 1 is a perspective view of one of the rigid, conical expanding members;

Fig. 2 is a side elevation, partly broken away, showing two of the identical conical expanding members assembled ready to be placed in a mold, to have the ring or barrel of lead, or other similar material, cast around them to form the expansible member of the anchoring device;

Fig. 3 is a side elevation of one form of my complete anchoring device;

Fig. 4 is a longitudinal, vertical section on the line 4—4 looking in the direction of the arrows;

Fig. 5 is a vertical section through a wall or similar support, showing my anchoring device assembled with a bolt and prior to expansion;

Fig. 6 is a vertical section through the wall or other support, similar to Fig. 5, and after the anchoring device has been expanded by a calking or similar tool. In this view the work is shown supported on the bolt;

Fig. 7 is a side elevation of a modification in which the lead, or similar ductile metal, is formed cylindrical, rather than in the preferred form shown in the other figures, in which it is barrel shaped;

Fig. 8 is a side elevation of a modified form of expanding member, in which the guide and assembly grooves are not employed;

Fig. 9 is a side elevation, partly broken away, of another modification;

Fig. 10 is a vertical section showing a dummy bolt screwed into the inner screw-threaded cone expanding member, prior to expanding the expanding device by calking, or similar means;

Fig. 11 is a vertical section through a wall or other support, showing the work supported on the bolt, with the head of the bolt contacting with the work.

My anchoring device is formed of two identical expanding units, so that there are no rights or lefts.

Each expanding unit 1 is formed hollow, and is provided with a conical wedge surface 2. Extending longitudinally from the conical surface 2, are a plurality of wings 3, 3 two such wings being preferably employed on each expanding member 1.

These expanding units 1 are formed of rigid, non-expansible metal, such as malleable iron, the wings 3, 3 being preferably cast integral with them. Preferably, though not necessarily, I provide each conical surface 2, with two positioning and guiding grooves 4, 4 for the reception of the ends 5, 5 of the wings 3, 3 on the opposed rigid non-expansible expanding member 1. These guide grooves 4, 4 assist in the quick and accurate assembling of the expanding members 1, 1, Fig. 2 prior to placing them in a suitable mold (not shown). This mold is provided with a suitable core to fit the axial bore 6 snugly.

The lead, or suitable ductile expansible member 7, is then cast around the staggered wings 3, 3 to form the complete unitary anchoring device. It will be seen that the expansible member, the lead 7, or similar metal, serves to hold the two units 1, 1 together for handling and shipping, and is also the expansible element of the anchoring device, In the form of my invention illustrated in Figures 1 to 8 inclusive a bolt 8, of the proper size for the particular size anchoring device, is passed through the axial bore 6 of the anchor, so that its head 9 will be at the inner end of the hole 10, Fig. 5. Blows of a hammer, acting on a calking tool (not shown), on the exposed expanding member 1, will cause the two expanding members 1, 1 to approach each other. This causes both conical surfaces 2, 2, one on each expanding member, to force the ductile expansible member 7 of lead, or similar material, firmly into contact with the wall of the hole 10. During this expansion action the ends 5, 5 of the wings will be forced out of the guide and assembling slots 4, 4, and will move up, more or less, on the conical surfaces 2, 2 on each expanding member 1, 1. After the expanding device is fully expanded, the work 11 is supported on the bolt 8 and held in place by the nut 12, Fig. 6.

Preferably, I form the lead holding or expansible member 7 in the form of a barrel, as shown in Figs. 3, 4, and 5. It may, however, be formed cylindrical as shown at 13, Fig. 7.

In Figs. 9, 10 and 11, I have shown another modification of my anchoring device.

In some cases it is desirable to have the head of the supporting bolt exposed. This head of the bolt may bear directly against the work supported, or it may be separated from the work by washers or similar means, if desired. In this modification, the bolt can be adjusted by a monkey wrench, spanner, or similar tool, acting directly on the head of the bolt.

In this modification the inner cone expanding member 20 is provided with female threads 21 and with two wings 22. It is also provided with a recess 24. The other cone expanding member 23 is unthreaded and provided with two wings similar to 22.

An expansible member of lead, or its alloys, or other ductile metal 25, is cast around the expanding members 20 and 23 with their wings 22, 22 as in the other form previously described.

In using this embodiment of my invention, the anchoring device is inserted in a hole 10 in a wall or other support 26, with a dummy bolt 27 screwed into the expanding member 20. The anchoring device is then expanded by calking in any suitable manner, the dummy bolt being in contact with the female threads 21 of the conical expanding member 20 during the calking or expanding. After the anchoring device is fully expanded in the hole, the dummy bolt 27 is withdrawn, and the work 11, is held in place by the head 9 of the bolt 8. In this form of my invention, the head of the bolt is on the exterior of the wall, and can be brought up flush against the work 11, any suitable tool being employed to rotate the bolt 8 within the expanding member, which is so formed as to permit adjustment of the bolt in or out, as may be required for different thicknesses of work 11.

In all forms of my invention, there must be a sufficient mass or quantity of lead, or its alloys, or other ductile metal, forming the expansible member 7 or 25, to ensure the maximum grip or bond between my anchoring device and the walls of the hole, prior to the surface 30 of one conical expanding member contacting with a similar surface 30 on the other opposed conical expanding member. This is essential because, if there be an insufficient quantity of expansible metal 7 or 25, these opposed surfaces 30, 30 would contact with each other prior to obtaining the desired maximum bond, grip or hold of my anchoring device with the wall of the hole in which it is mounted. With an insufficient mass or quantity of expansible metal 7 or 25, a bond or grip might be obtained which would be sufficient for limited loads. My anchoring device is primarily for heavy duty, where excessive loads are, or may be, thrown on the anchoring device. By having an ample surplus of the expansible metal and arranging my expanding members, as previously described, I insure that my anchoring device will not fail even when excessive loads are thrown upon it.

Further, by providing a surplus of moldable plastic material, located between the converging and expanding rigid members, I allow ample material to make up and compensate for oversized diameters of holes in masonry, and I also obtain a maximum length of contact, abutment and impregnation of the material of the expansible member, which is forced by expansion, compression or pressure to fill in every irregularity, crevice and interstice in the entire inner peripheral surface of the hole in the support.

I do not desire to be limited to the volume, mass, or shape of the expansible member: However, tension and pull tests exerted on anchors for rods ¾" in diameter, embodying my invention and set in concrete of appropriate strength, registered pulling loads of 28,710 pounds.

While I preferably employ guide assembly grooves 4, 4 they may be omitted as shown in Fig. 8.

My anchoring device, as previously noted, is particularly adapted for heavy duty in locations where excessive loads have to be supported, and where the failure of a device might lead to the loss of life, or serious damage to property.

I do not wish to be limited to the conical shape of the expanding member, since other forms can also produce anchors susceptible of meeting with the requirements outlined herein and coming within the scope of my claims.

Having thus described this invention in connection with different illustrative embodiments thereof, to the details of which I do not desire to be limited, what is claimed as new and what is desired to be secured by the Letters Patent is set forth in the appended claims.

What I claim is:

1. In an anchoring device the combination of two separate expanding members, each having protruding wings, which are adapted to contact with the other expanding member, and an expansible binding member, holding the two expanding members together.

2. In an anchoring device the combination of two separate expanding members, each having protruding wings, which are adapted to contact with the other expanding member, and an expansible binding member, extending around said wings and adapted to hold the expanding members together, and also to make a firm bond with the walls of the hole, in which the anchoring device is mounted.

3. In an anchoring device the combination of two separate rigid expanding members, each having longitudinally extending wings which are adapted to contact with the other rigid expansible member, and a relatively soft expansible ring surrounding said wings and adapted to hold them together, and also to form a locking engagement with the surface of a hole in which the bolt anchor is mounted.

4. In an anchoring device the combination of two separate rigid conical expanding members, each having wings extending longitudinally beyond the respective conical surfaces of the expanding members, and contacting with the opposed conical expanding member, and an expansible member surrounding said conical expanding members, and adapted to hold them together for shipping and handling, and to be expanded radially by blows on either rigid, conical expanded member.

5. In an anchoring device the combination of two separate rigid conical expanding members, each having wings extending longitudinally beyond the respective conical surfaces of the expanding members, and contacting with the opposed conical expanding member, and a ductile metal member surrounding said conical expanding members, and adapted to hold them together for shipping and handling, and to be expanded radially by blows on either rigid, conical expanded member.

6. In an anchoring device the combination of two separate opposed non-expansible rigid, conical expanding members, each having a plurality of wings extending longitudinally and staggered with relation to the wings on the other rigid non-expansible member, the ends of said wings contacting with the conical surface of the opposed expanding member, and adapted to ride up said opposed conical surface when blows or pressure are applied to either expanding member, and a ductile expanding member adapted to hold the two expanding members together for handling and shipping, and also to become the active expansible member of the anchoring device when positioned in a hole.

7. In an anchoring device the combination of two opposed malleable iron, conical expanding members, each having a plurality of integral wings extending longitudinally and staggered with relation to the integral wings on the other malleable iron expanding member; the ends of said integral wings contacting with the conical surface of the opposed expanding member and adapted to ride up said opposed conical surface when blows are applied to either expanding member, and a ring of lead or similar expanding material adapted to hold the two malleable iron expanding members together for handling and shipping, and also to become the active expansible member of the anchoring device when positioned in a hole.

8. A new article of manufacture for an expanding device comprising a hollow, rigid, non-expansible, conical, expanding member, having integral wings extending longitudinally beyond the conical surface of said member, said expanding member being provided with guides for the reception of wings of a duplicate expanding member.

9. A heavy duty anchoring device, adapted to be expanded by a calking tool or similar means, comprising two separate and identical unconnected, rigid, conical expanding members, each having wings adapted to ride up the conical surface of the other, and an intermediate exterior, expansible, ductile metal barrel or ring to hold the rigid, conical members together.

10. A heavy duty anchoring device, adapted to be expanded by a calking tool or similar means, comprising two identical unconnected, rigid, conical expanding members, each having wings and guides for the reception of the wings on the opposed conical expanding member, and an intermediate exterior, expansible, ductile metal barrel, or ring to hold the rigid, conical members together.

11. In an anchoring device the combination of two separate expanding members, each being provided with protruding wings which are adapted to ride up the other expanding member, one of the expanding members having a screw-threaded axial bore, and an expansible binding member holding the two expanding members together.

12. In an anchoring device the combination of two separate rigid, expanding members, each having protruding wings, which are adapted to ride up the other expanding member, one of the expanding members having a screw-threaded axial bore, and a ductile metal binding member holding the two expanding members together and adapted to make a firm bond or grip with a support.

GABRIEL E. ROHMER SALEH.